United States Patent [19]
Chiloyan et al.

[11] Patent Number: 6,008,735
[45] Date of Patent: *Dec. 28, 1999

[54] METHOD AND SYSTEM FOR PROGRAMMING A REMOTE CONTROL UNIT

[75] Inventors: John H. Chiloyan, Redmond; Edwin W. Thorne, III, Seattle, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/794,687

[22] Filed: Feb. 3, 1997

[51] Int. Cl.⁶ .................................................. G05B 19/04
[52] U.S. Cl. ................................ 340/825.22; 455/151.4; 455/352; 340/825.72; 341/176; 359/146; 359/148
[58] Field of Search ................................... 455/4.1, 151.4, 455/151.2, 352, 151.1; 340/825.69, 825.72, 825.71, 825.57, 825.63, 825.62, 825.22; 341/176, 22; 359/142, 145, 146, 148, 147; 348/734; 360/69; 1/1

[56] References Cited

U.S. PATENT DOCUMENTS

| | | | |
|---|---|---|---|
| 4,774,511 | 9/1988 | Rumbolt et al. ..................... | 340/825.69 |
| 4,825,200 | 4/1989 | Evans et al. ..................... | 340/825.72 X |
| 4,866,434 | 9/1989 | Keenan .............................. | 340/825.72 |
| 5,228,077 | 7/1993 | Darbee ................................ | 348/734 X |
| 5,386,251 | 1/1995 | Movshovich ........................... | 348/734 |
| 5,410,326 | 4/1995 | Goldstein ............................. | 348/734 |
| 5,455,570 | 10/1995 | Cook et al. ......................... | 340/825.22 |
| 5,488,571 | 1/1996 | Jacobs et al. ........................ | 364/705.07 |
| 5,490,209 | 2/1996 | Kennedy et al. ......................... | 379/97 |
| 5,515,052 | 5/1996 | Darbee .................................... | 341/176 |
| 5,535,147 | 7/1996 | Jacobs et al. ........................ | 364/705.07 |
| 5,570,297 | 10/1996 | Brzezinski et al. ................... | 364/514 R |
| 5,590,192 | 12/1996 | Lovett et al. ........................ | 360/69 X |
| 5,594,462 | 1/1997 | Fishman et al. .......................... | 345/2 |
| 5,619,191 | 4/1997 | Lambropoulos et al. .......... | 340/825.69 |
| 5,629,868 | 5/1997 | Tessier et al. ....................... | 364/514 R |
| 5,650,774 | 7/1997 | Drori .................................. | 340/825.32 |
| 5,652,602 | 7/1997 | Fishman et al. ......................... | 345/156 |
| 5,657,078 | 8/1997 | Saito et al. ............................. | 348/180 |
| 5,710,605 | 1/1998 | Nelson .................................... | 348/734 |

OTHER PUBLICATIONS

U.S. Patent application Ser. No. 08/394,659 entitled"System and Method for Remotely Managing Memory In A Portable Information Device From An External Computer," inventors Vinay Deo and Neil S. Fishman, filed Feb. 2, 1995.

U.S. Patent application Ser. No. 08/428,917 entitled "System and Method for Remotely Programming A Portable Information Device Using Optical Serial Data Transmission From A Frame–Scanning Graphics Display Device," inventors Victor Shiff, Neil S. Fishman, and Philip Brzezinski, filed Apr. 25, 1995.

*Primary Examiner*—Michael Horabik
*Assistant Examiner*—William H. Wilson, Jr.
*Attorney, Agent, or Firm*—Jones & Askew, LLP

[57] ABSTRACT

A method and system for programming a remote control unit to control the operation of a controllable device. A group of code sets associated with a particular type and brand of controllable device are selected from a database of code sets stored in the memory of the remote control unit. The commands of each code set in the group of code sets are compared to identify similarities and dissimilarities between command formats within each respective code set. The user tests a command and provides feedback to the remote control unit regarding the results of such testing. When the testing of a command is successful, the remote control unit eliminates code sets containing a command format that is dissimilar to the format of the command that was successfully tested. By eliminating code sets from the group of code sets and testing other commands, the remote control unit eliminates all but one code set. The one remaining code set is identified as the best code set and is added to the remote control unit to allow the remote control unit to transmit signals to control operation of the controllable device.

26 Claims, 7 Drawing Sheets

CODE SETS

| COMMANDS | A | B | C | D | E |
|---|---|---|---|---|---|
| POWER | 3 | 3 | 4 | 4 | 4 |
| MUTE | 1 | 2 | 1 | 2 | 2 |
| VOLUME | 7 | 8 | 8 | 7 | 8 |
| CHANNEL | 5 | 5 | 5 | 6 | 5 |

FIG.4A

| TEST | CODE SET / COMMAND TESTED | TEST SUCCESSFUL? | CODE SETS ELIMINATED | CODE SETS REMAINING |
|---|---|---|---|---|
| 1 | A/POWER 3 | NO | - | A,B,C,D,E |
| 2 | C/POWER 4 | YES | A,B | C,D,E |
| 3 | C/MUTE 1 | NO | - | C,D,E |
| 4 | D/MUTE 2 | YES | C | D,E |
| 5 | D/VOLUME 7 | YES | E | D |

METHOD AND SYSTEM FOR PROGRAMMING A REMOTE CONTROL UNIT

TECHNICAL FIELD

The present invention relates generally to remote control units and, more specifically, to a method and system for programming a remote control unit to control operation of a controllable device.

BACKGROUND OF THE INVENTION

Many electronic devices frequently found in the home, such as televisions, video cassette recorders, and stereos, support remote control operational capabilities. Remote control units are typically hand-held units that allow the user to more easily and conveniently control the operation of a controllable device from a remote location by manipulating controls on the remote control unit rather than requiring the user to manipulate buttons or other controls on the controllable device itself. Remote control units typically include buttons, switches, or other control mechanisms that allow the user to perform most, or all, of the operations associated with the controllable device.

Remote control capability typically involves a remote control unit and a receiver associated with the device to be controlled. The remote control unit includes a transmitter for sending command signals to the receiver. Command signals are usually transmitted via an infrared signal, responsive to the user activating a button on the remote control unit. The infrared signal is detected by an infrared receiver located on or near the front surface of the device to be controlled.

Many different types of devices support remote control capabilities. Each different device typically has a separate, dedicated remote control unit associated with it. When a user wishes to control multiple devices, the user must use the correct one of the multiple remote control units to operate the device. For a typical entertainment center in the home, three, four, or even more remote control units may be required to operate all devices. This use of multiple remote control units can be cumbersome and confusing.

Universal remote control units have been devised to control multiple devices with a single remote control unit. A universal remote control unit can be programmed to communicate with a number of different devices and thus replace a multiplicity of dedicated remote control units. Universal remote control units can typically control multiple models or brands of a single type of device and also can control multiple types of devices. For example, not only can a universal remote control unit control different models and brands of televisions, but such units can also control different types of devices, such as video cassette recorders, stereos, and the like.

Universal remote control units include programming that allows the user to perform a set-up process to program the universal remote control unit to operate a specific device. Typically, a universal remote control unit includes a code set for each device that it controls. A code set is a group of commands that operate a controllable device and are typically different for each type and brand of device. For example, the code set that controls a SONY brand television is most likely different than the code set that controls a MAGNAVOX brand stereo. The universal remote control unit, therefore, must be programmed by the user to operate each type, brand, and model of a device.

Programming a universal remote control unit during a set-up process can be a tedious task. Typically, the user is required to look in an instruction manual to identify the proper code set for each device to be controlled from a large number of possible code sets. Perusing a user's manual to identify the correct code set for many different types and brands of devices is time-consuming and interjects a high probability of error into the set-up process.

Also, each universal remote control unit is typically programmed by the user via a special sequence of programming steps. Most universal remote control units, however, do not provide the user with feedback during the programming process. A single mistake by the user during the programming process may cause the process to fail and thus may require that the entire process be repeated. Programming the universal remote control unit can therefore be a frustrating and time-consuming endeavor.

Therefore, a need exists for an automated set-up process for a remote control unit, thereby minimizing or eliminating the need for the user to use an instruction manual to manually identify the correct code set for a controllable device.

SUMMARY OF THE INVENTION

The present invention provides a method and system for programming a remote control unit to control the operation of a controllable device. The present invention provides a set-up process for programming a remote control unit by selecting a group of code sets associated with a particular type and brand of device from a database of code sets stored in the memory of the unit.

The commands of each code set in the group of code sets are compared to identify similarities and dissimilarities between command formats within each respective code set. The user tests a command and provides feedback to the universal remote control unit regarding the results of such testing. When the testing of a command is successful, the remote control unit eliminates code sets containing a command format that is dissimilar to the format of the command that was successfully tested. By eliminating code sets from the group of code sets and testing other commands, the remote control unit typically eliminates all but one code set. The one remaining code set is identified as the "best code set", i.e., the code set most likely to be the code set that controls the controllable device. The one remaining code set is then added to the remote control unit to allow the remote control unit to transmit signals to control operation of the controllable device.

BRIEF DESCRIPTION OF THE DRAWING

FIGS. 3A–3M are displays shown on the display of the remote control unit shown in FIG. 2 during the set-up process in accordance with an embodiment of the present invention.

FIGS. 4A and 4B illustrate an example of the comparison and elimination of code sets performed during the set-up process of an embodiment of the present invention.

DETAILED DESCRIPTION

Figure 1:
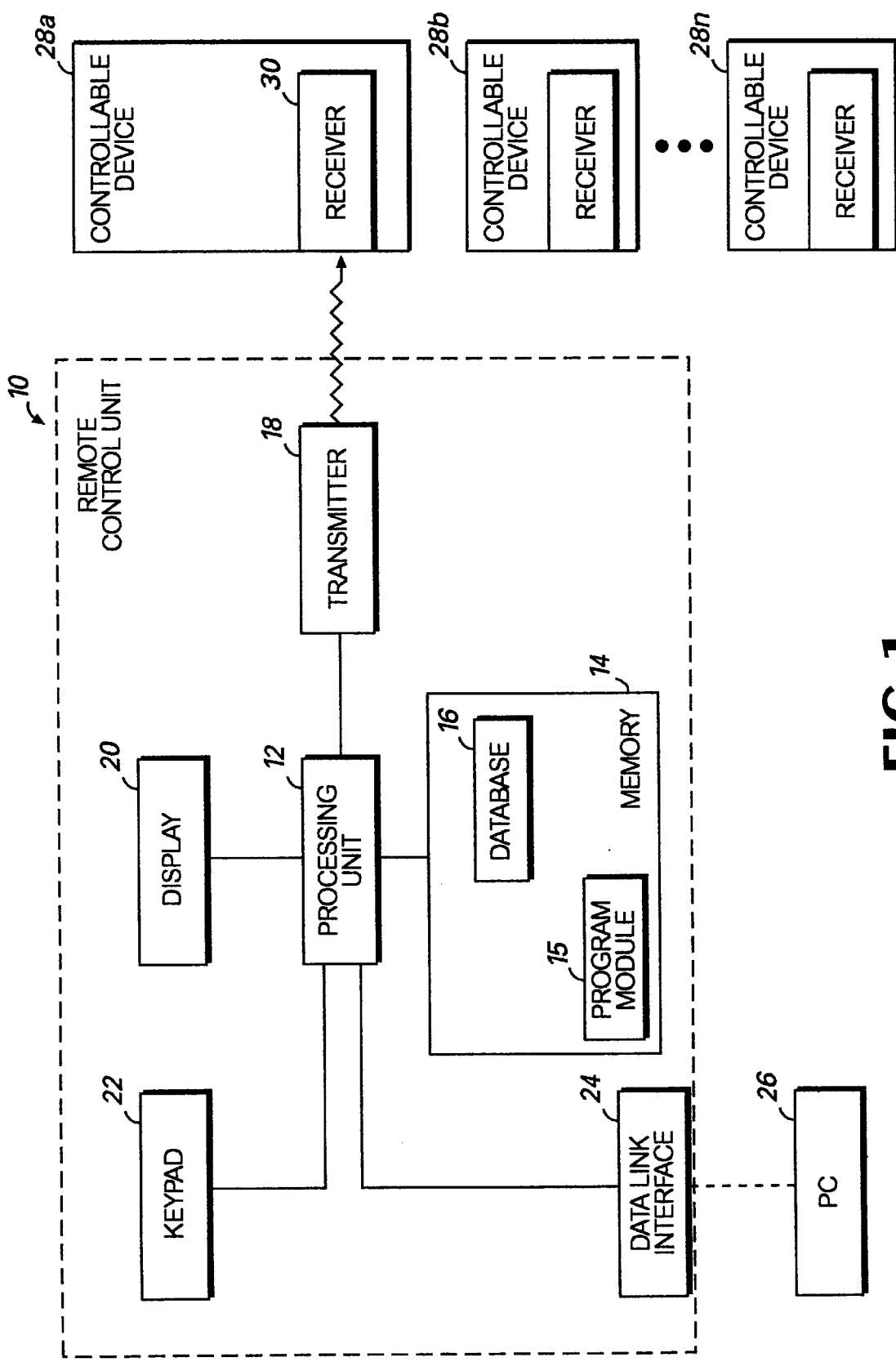
FIG. 1 is a block diagram of the remote control unit for an embodiment of the present invention.

Turning next to the figures, the preferred embodiment will now be described in detail. The preferred embodiment of the present invention is directed to a method and system for programming a remote control unit to control the operation of a controllable device.

In general, the preferred embodiment of the present invention provides a set-up process for programming a remote control unit by comparing code sets stored in the remote control unit to identify similarities and dissimilarities between respective commands in the code sets. The preferred embodiment utilizes user feedback to eliminate incorrect code sets and to determine the code set that controls the controllable device.

Turning first to the nomenclature of the specification, the detailed description which follows is represented largely in terms of processes and symbolic representations of operations by conventional computer components, including a processing unit, memory storage devices for the processing unit, and a display device. These operations include the manipulation of data bits by the processing unit and the maintenance of these bits within data structures resident in one or more of the memory storage devices. Such data structures impose a physical organization upon the collection of data bits stored within memory and represent specific electrical or magnetic elements. These symbolic representations are the means used by those skilled in the art of computer programming and the construction of computing devices to most effectively convey teachings and discoveries to others skilled in the art.

For the purposes of this discussion, a process is generally a sequence of steps executed by a computing device leading to a desired result. These steps generally require physical manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computing device operations, and that these terms are merely conventional labels applied to physical quantities that exist within and during operation of the computing device.

It should also be understood that manipulations within the computing device are often referred to in terms such as adding, comparing, moving, etc. which are often associated with manual operations performed by a human operator. The operations described herein are machine operations performed in conjunction with a human operator or user that interacts with a remote control unit. The machines used for performing the operation of the preferred embodiment of the present invention, as will be understood, include remote control units or other suitable computing devices.

Furthermore, it should be understood that there is a distinction between the methods, steps, or operations completed by a computing device and the method of computation itself. The present invention does not involve a method of computation. Instead, the present invention relates to methods, processes, steps, or operations for a computing device and the processing of electrical or other physical signals to generate desired physical signals and to display results and interactions.

For the preferred embodiment, the input device is implemented as a hand-held universal remote control unit capable of transmitting command signals for controlling the operation of different devices, such as televisions, video cassette recorders, stereos, and the like. The preferred universal remote control unit can include a directional keypad having distinct buttons, or a joystick, for allowing the user to control the movement of a cursor or other visible item on a screen or display in the up, down, left, and right directions. The remote control unit may also include keys for controlling relative changes to the volume or channel, as well as a numeric key pad for controlling absolute changes to the channel. The remote control unit and its functions are more fully described with respect to FIG. 2.

Selected operating functions of the device to be controlled are handled by an input device capable of supplying command signals to the controllable device. Although the input device is preferably implemented as a universal remote control unit, referred to herein as a "remote control unit", capable of controlling many different types of electronic equipment, it should be understood that the input device may also be implemented as any other device, such as a personal computer with remote control functionality, that is capable of transmitting commands to such electronic equipment.

FIG. 1 is a block diagram of the remote control unit in accordance with the invention, showing the basic components of the unit. The preferred embodiment of the present invention is implemented on a remote control unit that can control multiple models or brands of a single type of device and/or multiple types of devices The primary components of the remote control unit 10 include a processing unit 12, a memory 14, a transmitter 18, a display 20, and a keypad 22. The memory 14, which is connected to the processing unit 12, stores one or more program modules 15 and a database 16 of code sets associated with various types and brands of devices. The memory 14 can be implemented as a combination of read/write memory, such as static random access memory (SRAM), and read-only memory, such as electrically programmable read only memory (EPROM). Preferably, the program module implementing the set-up process implemented by the preferred embodiment of the present invention is stored in the read only memory of the remote control unit 10.

The transmitter 18, connected to the processing unit 12, transmits signals from the remote control unit to a receiver 30 associated with one of a plurality of controllable devices 28a. Other controllable devices that can be controlled by the remote control unit are shown as devices 28b through 28n. The transmitter 18 is preferably an infrared transmitter that transmits encoded infrared command signals to the receiver of a controllable device in a manner well known to those skilled in the art. The receiver, which is preferably implemented as an infrared receiving device, decodes the command signals transmitted from the remote control unit 10. After the receiver 30 decodes the command, the command is executed by the controllable device 28.

It should be understood that the controllable device 28 can be one of a number of various models, brands, or types of devices that can be controlled by the remote control unit. A listing of some of the types of devices, as well as a description of each type of device that may be controlled by the remote control unit 10, is provided in Table I below:

TABLE I

| Device Type | Description |
| --- | --- |
| TV | Television |
| VCR | Video cassette recorder |
| Cable Box | Cable box |
| CD Player | Compact disk player |

TABLE I-continued

| Device Type | Description |
| --- | --- |
| Tuner | Audio tuner |
| Cassette | Audio cassette |
| Satellite | Satellite tuner |
| Laserdisc | Laser disc player |
| Appliance | Lights |

It should be understood that additional types of devices, not identified in Table I, may be controlled by the remote control unit in accordance with the preferred embodiment of the present invention. Therefore, Table I should be understood to identify merely a subset of the types of devices that can be controlled in accordance with the present invention.

A display 20 is provided on the remote control unit 10 to visually display information to the user. In one embodiment, the display is a liquid crystal display, but it should be understood that the present invention can be implemented with any other type of suitable display means The keypad 22 is used by the user to input data to the universal remote control unit, and may comprise any combination of buttons, switches, and the like.

The remote control unit also includes a data link interface 24. The interface 24 can be connected to a computer 26 or other suitable device to allow data, such as additional code sets, to be downloaded from the computer 26 and stored in the memory 14 of the remote control unit. In one embodiment, the interface 24 is a Timex data link interface, as described in pending U.S. patent application Ser. No. 08/394,659 entitled "System and Method for Remotely Managing Memory in a Portable Information Device from an External Computer". However, the interface may be any other suitable type of interface, such as an RS-232 serial interface.

Figure 2:
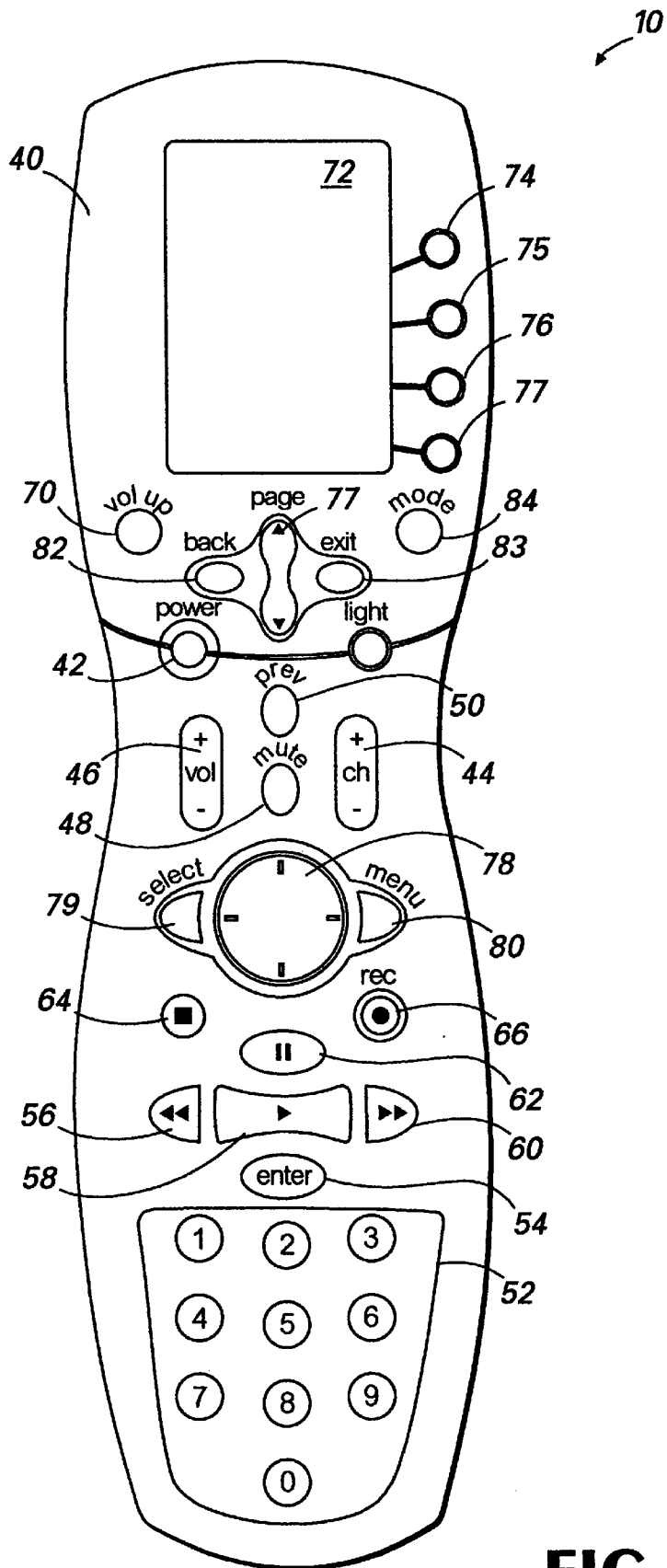
FIG. 2 shows the face of the remote control unit for an embodiment of the present invention.

The preferred embodiment of the present invention utilizes the remote control unit shown in FIG. 2. It should be understood that the present invention is not limited to the specific arrangement of the controls for the remote control unit shown in FIG. 2, but can be utilized with any suitable remote control unit. Thus, it should be understood that the remote control unit is the preferred mechanism by which the user communicates with the device to be controlled, but that any suitable command input device for communicating commands to the controllable device will suffice.

FIG. 2 illustrates the top surface, or face 40, of an exemplary industrial design that may be used to house the components illustrated in FIG. 1. The face 40 of the remote control unit includes a variety of buttons that are common to remote control units. These include a power button 42, a channel up/down button 44, a volume up/down button 46, a mute button 48, a previous channel button 50, and a ten digit numeric keypad 52 with an associated enter button 54.

The remote control unit also includes buttons that are common to other controllable devices, such as video cassette recorders and the like. These keys include a rewind button 56, a play button 58, a fast-forward button 60, a pause button 62, a stop button 64, and a record button 66. The remote control unit also includes other buttons for controlling other operations of other devices. A display screen 72 is provided on the remote control unit to display information to the user. Buttons 74, 75, 76, and 77 are provided to allow the user to select an option that is provided on the display adjacent to the button.

Other buttons on the remote control unit include a thumbpad 78 having a four-way directional control, and an associated select button 79 and a menu button 80. Also provided on the remote control unit are a display page up/down button 81, a back button X2, an exit button 83, and a mode button 84 The page button 81 causes additional pages to be displayed if more information is available than can be displayed on a single page of the display. The back button 82 causes the previous screen to be displayed. The mode button 84 displays a list of devices previously set up that can be controlled by the remote control unit. The remote control unit also includes a setup button 70.

It should be understood that the present invention is not limited to the configuration of the face of the remote control unit shown in FIG. 2, or to any other specific configuration. The preferred embodiment of the present invention may be implemented using any configuration of a remote control device that allows a user to control operation of a controllable device.

The user activates the setup button 70 when the user wants to program the remote control unit to operate a specific device. When the user activates the setup button 70, programming stored in the memory of the remote control unit is invoked to initiate the setup process. The program causes the displays shown in FIGS. 3A–M to be displayed on the display 72 of the remote control unit during the setup process. It should be understood, however, that the displays shown in FIGS. 3A–M are shown for purposes of describing the example below, and other displays may be provided during the setup process. The description below will describe the setup of the remote control unit to include the capability to control a ZENITH brand television. It should also be understood that the associated displays and descriptions of the setup process relating to a ZENITH brand television are for illustrative purposes only.

Figure 3A:
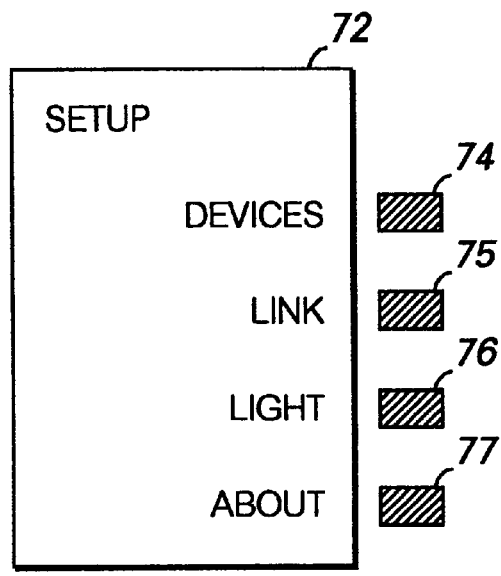

When the user activates the setup button, the "setup" display of FIG. 3A is shown on the display 72 of the remote control unit. The display gives the user various options that can be selected by activating one of buttons 74–77 adjacent to the displayed option. If the user wants to perform the setup process for a new device, the user activates button 74, adjacent to the "Devices" option.

Figure 3B:
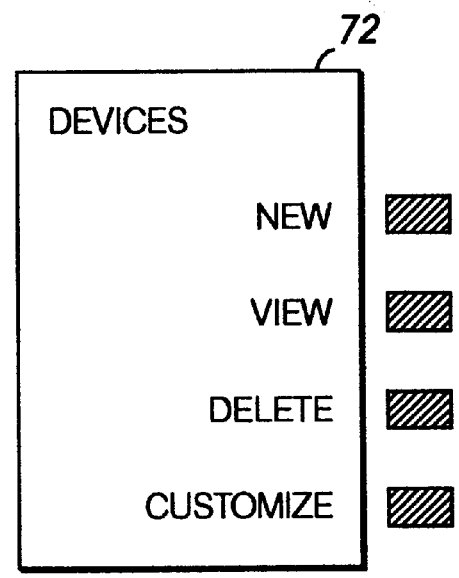
Figure 3C:
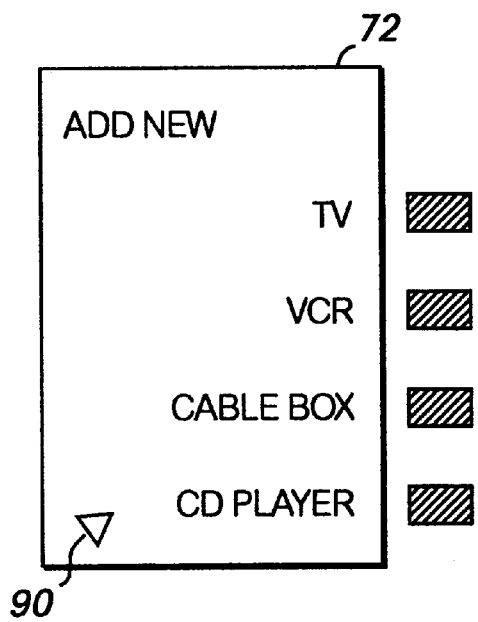

When the user selects the Devices option, the "devices" display of FIG. 3B is shown on the display 72 of the remote control unit. To add a new device in accordance with the preferred embodiment of the present invention, the user selects the "new" option. Upon selection of the "new" option, the display of FIG. 3C is displayed. The user selects the type of device to be added. It should be understood that a device is "added" when the remote control unit is programmed to control operation of that device. The user selects the type of device to be added by scrolling through a list of possible device types by using the page up/down button 91. The scroll arrow 90 indicates to the user that additional items in the list may be displayed.

Figure 3D:
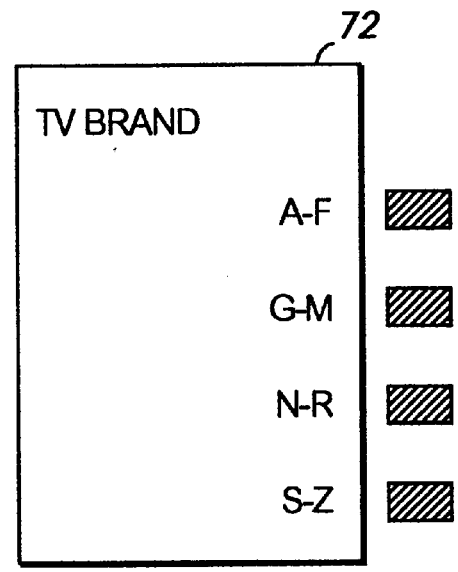
Figure 3E:
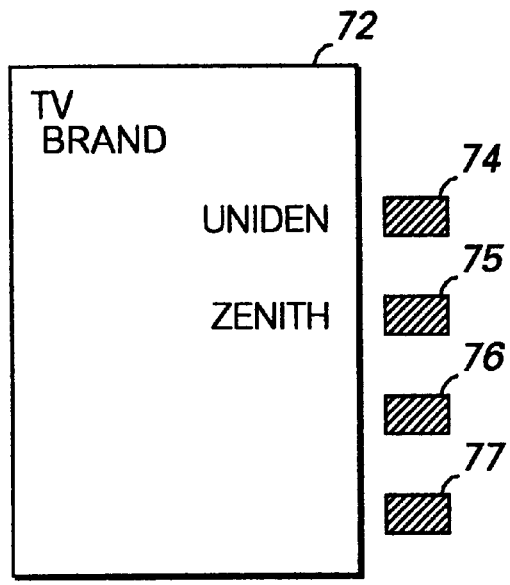

For the purposes of this example, the user selects the button adjacent to the "TV" option. The next display is shown in FIG. 3D, in which the user selects the button corresponding to the first letter of the brand of the television. In this example, the user selects the button adjacent to the "S–Z" option because the television is a ZENITH brand television, Upon selecting the "S–Z" option, the display of FIG. 3E is shown, which lists the brands having first letters corresponding to the range of letters S–Z. For the purposes of this example, the display of FIG. 3E shows a short illustrative list of brands having first letters S–Z, but it should be understood that the list may include many more brands than those shown. The user then selects the button corresponding to the "ZENITH" option to select the correct brand.

Figure 3F:
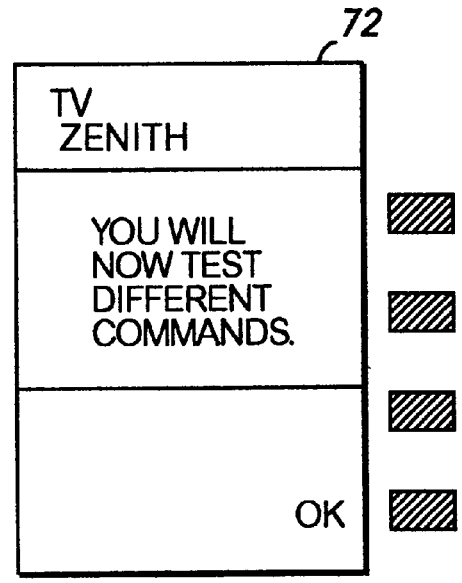

Upon selecting the ZENITH option, the display of FIG. 3F is shown. The display informs the user that different commands will be tested to determine the proper code set for the user's ZENITH television. The user activates the button corresponding to the "OK" option to continue.

As will be described more fully below, the remote control unit accesses device code sets stored in a database in its memory to identify code sets corresponding to ZENITH brand televisions. If more than one code set exists for ZENITH brand televisions, the correct code set must be identified. To identify the "best code set", i.e., the code set that the remote control unit determines to be the most likely to be the code set that controls the controllable device, the remote control unit examines the formats of commands within the various code sets to determine which commands within the various codes sets are similar. When the remote control unit identifies dissimilarities between command formats, commands having dissimilar formats are tested to determine which command format is correct.

Figure 3G:
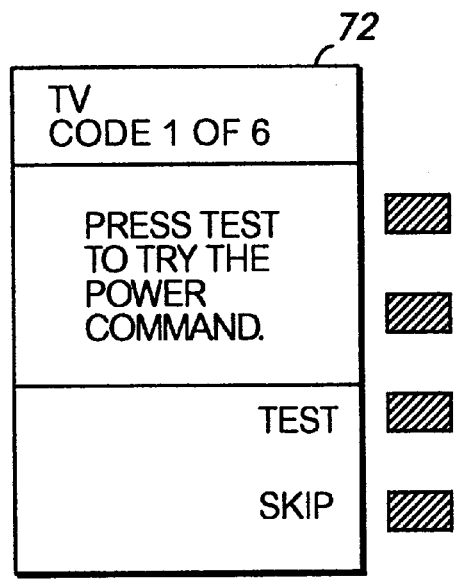

The display of FIG. 3G is shown when the remote control unit determines that dissimilar command formats exist for various code sets corresponding to ZENITH brand televisions. Because there are more than one command formats for ZENITH brand televisions, the remote control unit will select a command to test to eliminate incorrect command formats. In an exemplary embodiment of the invention, the power command is tested first. The power command is tested because it is the command common to most controllable devices. However, commands other than the power command could be tested first.

To test the power command, the user activates the button corresponding to the "test" option. Upon activation of the test option, the transmitter of the remote control unit transmits a power command to the receiver of the ZENITH brand television. The user determines if the power command works, i.e., whether the testing of the power command caused the ZENITH brand television to turn on (or turn off if the television was already on).

Figure 3H:
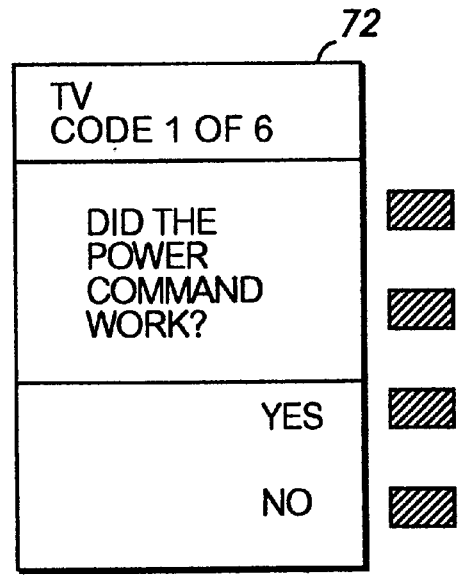

After the power command is tested, the display of FIG. 3H is provided to prompt the user to provide feedback to the remote control unit regarding the effect of the test. If the power command did not work, the user selects the "no" option and the display of FIG. 3G is again shown where the user is prompted to test another power command having a different command format from another code set.

If the power command worked, the user selects the "yes" option and the remote control unit determines that the correct code set is one that includes a power command with a format similar to the format of the power command that worked. Therefore, the remote control unit eliminates from the setup process any code set that includes a power command having a format that is dissimilar to the format of the power command that worked.

Figure 3M:
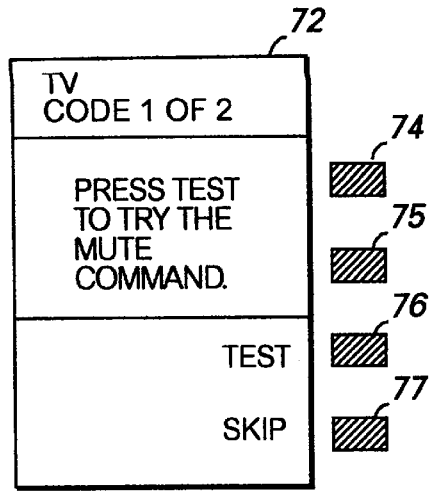
Figure 3M:
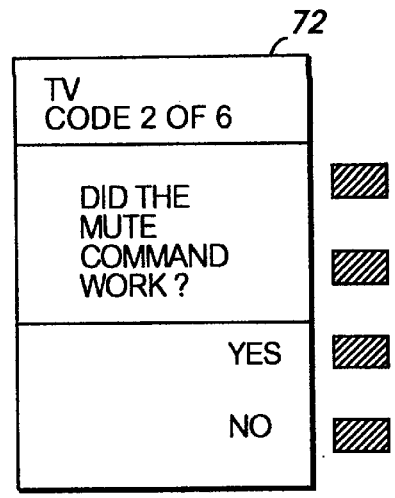
Figure 3M:
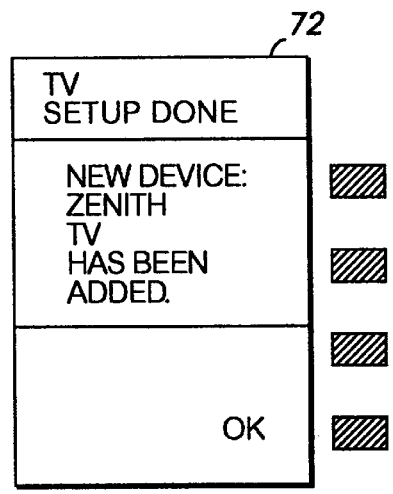
Figure 3M:
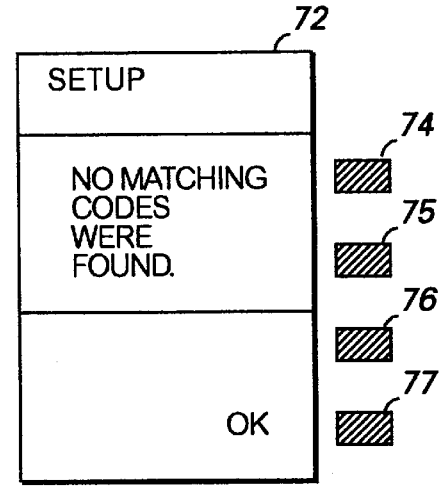
Figure 3M:
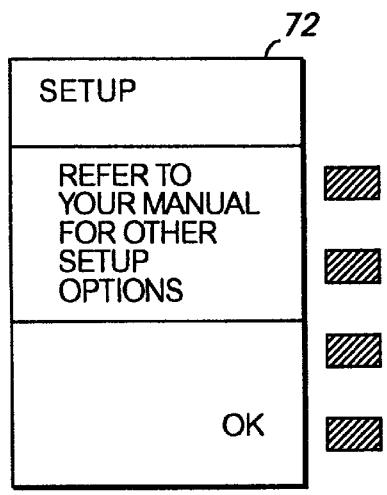

If there are multiple code sets that contain the correct power command format, the display of FIG. 3I prompts the user to test another command. The user activates the button corresponding to the "test" option to test another command, e.g., the mute command. The display of FIG. 3J prompts the user to provide feedback as to whether the testing of the mute command worked. If the mute command worked, the user provides feedback by selecting the "yes" option and the remote control unit eliminates those code sets that include a mute command with a format dissimilar to the mute command format that worked. The remote control unit also eliminates all code sets that do not support a mute command. Additional commands are tested and feedback is provided by the user in the manner specified above until all but one code set is eliminated. When one code set remains, it is identified as the "best code set", and the display of FIG. 3K informs the user that the ZENITH brand television has been added to the remote control unit. If no best code set can be identified, then the displays of FIGS. 3L and 3M are shown, which respectively inform the user that no matching code sets were identified and instruct the user to refer to a user's manual for additional setup options.

The method by which the remote control unit determines the best code set for a controllable device is further described below with reference to FIGS. 4A and 4B. For the purposes of the example described with reference to FIGS. 4A and 4B, assume that the user desires to add a ZENITH brand television to the remote control unit. When the user initiates the setup process, the remote control unit searches the database of code sets stored in the memory of the remote control unit to identify all code sets for ZENITH brand televisions.

For purposes of this discussion, assume that the remote control unit identifies five code sets in the database stored in its memory that are associated with ZENITH brand televisions. For example, different models of televisions may cause multiple code sets to exist. Therefore, the setup process must be implemented to determine which of the five code sets is the best code set for the user's ZENITH brand television.

The five code sets associated with ZENITH brand televisions are shown in FIG. 4A as code sets A, B, C, D, and E. For simplicity of this discussion, assume that each code set includes only four commands: power, mute, volume, and channel. Typically, the volume command comprises two separate commands: a volume up command and a volume down command. Similarly, the channel command typically comprises a channel up and a channel down command. However, for purposes of this example, the volume and channel commands are each shown as a single command. It should be understood that many more commands may be included within a code set. Additionally, each command within each code set is identified in FIG. 4A as a number. For the sake of discussion, like numbers will indicate similar command formats, whereas different numbers indicate dissimilar command formats.

A "command format" refers to the physical characteristics of the signal used to transmit the command from the transmitter of the remote control unit to the receiver of the controllable device. Characteristics of the signal may include the carrier frequency, the number of bits comprising the signal, the pulse width of each bit, and the encoding of the bits to represent a command, although other characteristics may also be included. Therefore, each command in each code set has a command format that includes various command characteristics maintained in a database in the memory, preferably ROM, of the remote control unit.

Commands in different code sets are determined by the remote control unit. to be "similar" when the command format of each command is either identical or within a predetermined tolerance of each respective command characteristic of the same command in another code set. Commands in different code sets are determined by the remote control unit to be "dissimilar" when one or more of the command characteristics is not within the predetermined tolerance. Of course, commands in two code sets are deemed to be dissimilar when a command exists in one code set but no corresponding command exists in the other code set.

If a command characteristic for two corresponding commands are not within the predetermined tolerance, the remote control unit assumes that the commands will be interpreted differently by a receiver and, therefore, the commands are dissimilar. For example, the tolerance for the carrier frequency characteristic may be 15 percent. In this case, a command in one code set with a carrier frequency that does not fall within the range of 15 percent above or below the carrier frequency of the corresponding command in another code set will be deemed dissimilar. However, it should be understood that the tolerances used in accordance with the present invention can be varied to be any tolerance that supports the reliable comparison of commands. The tolerances used in the present invention are identified by examining and comparing the characteristics of command signals that control various controllable devices to determine the differences between characteristics of each respective command that controls each respective device. The extent of the differences between the command characteristics can then be used to define the tolerances within which a particular characteristic must fall to be recognized as a particular command for a particular device.

After the five code sets are identified for ZENITH brand televisions, as shown in FIG. 4A, the remote control unit compares the power command in each code set to the power command in every other code set to determine which code sets have similar power commands. As stated above, each command in FIG. 4A is identified by a number, but it should be understood that the remote control unit compares command characteristics associated with each command to make the determination whether commands are similar or dissimilar.

The power command of each code set is compared to the power command of each other code set to determine which code sets contain similar power commands. In the example of FIG. 4A, code sets A and B contain similar power commands because each power command is identified by the numeral 3.

Code sets C, D, and E also contain similar power commands, signified by the numeral 4. For purposes of this discussion, it is assumed that the power commands 3 and 4 are dissimilar because they do not fall within a specified tolerance of each other. Because there are dissimilar power commands among the five possible code sets, the preferred embodiment of the present invention prompts the user to test the power command of one of the code sets. In this example, the user is prompted to test the power command 3 from code set A. The table of FIG. 4B is to be viewed in conjunction with FIG. 4A and summarizes the testing of commands and the elimination of code sets based on the results of such tests.

If the test of the power command 3 from code set A does not work, then the remote control unit prompts the user to test another power command with a dissimilar format from another code set. Therefore, the remote control unit prompts the user to test power command 4. In this example, the test of power command 4 is successful. Therefore, the remote control unit eliminates all code sets that contain power commands other than power command 4. In this manner, code sets A and B are eliminated.

After the correct power command is tested and multiple code sets remain, another command is selected. In the example of FIG. 4A, the mute command is selected. The remote control unit performs a comparison of mute commands for the remaining code sets C, D, and E. The comparison determines that code set C includes mute command I and code sets D and E include mute command 2.

The remote control unit then prompts the user to test mute command 1. In this example, the testing of mute command 1 is not successful. The remote control then prompts the user to test a mute command having a format dissimilar to that of mute command 1. Therefore, mute command 2 is tested. In this example the testing of mute command 2 is successful. The remote control unit then eliminates all remaining code sets that include a mute command dissimilar to mute command 2. In this manner, code set C is eliminated.

Because more than one code set remains (code sets D and E), another command is selected. In this example, the volume command is selected and a comparison is performed. The comparison determines that code set D includes volume command 7 and code set E includes volume command 8. The remote control unit prompts the user to test volume command 7. If volume command 7 works, as it does in this example, the remote control unit eliminates all remaining code sets that do not include volume command 7. In this manner, code set E is eliminated. Code set D is then the only remaining code set and is therefore identified as the best code set for the user's ZENITH brand television. Code set D is then added to the remote control unit such that the remote control unit can use code set D to properly format commands to control operation of the ZENITH brand television.

Figure 5:
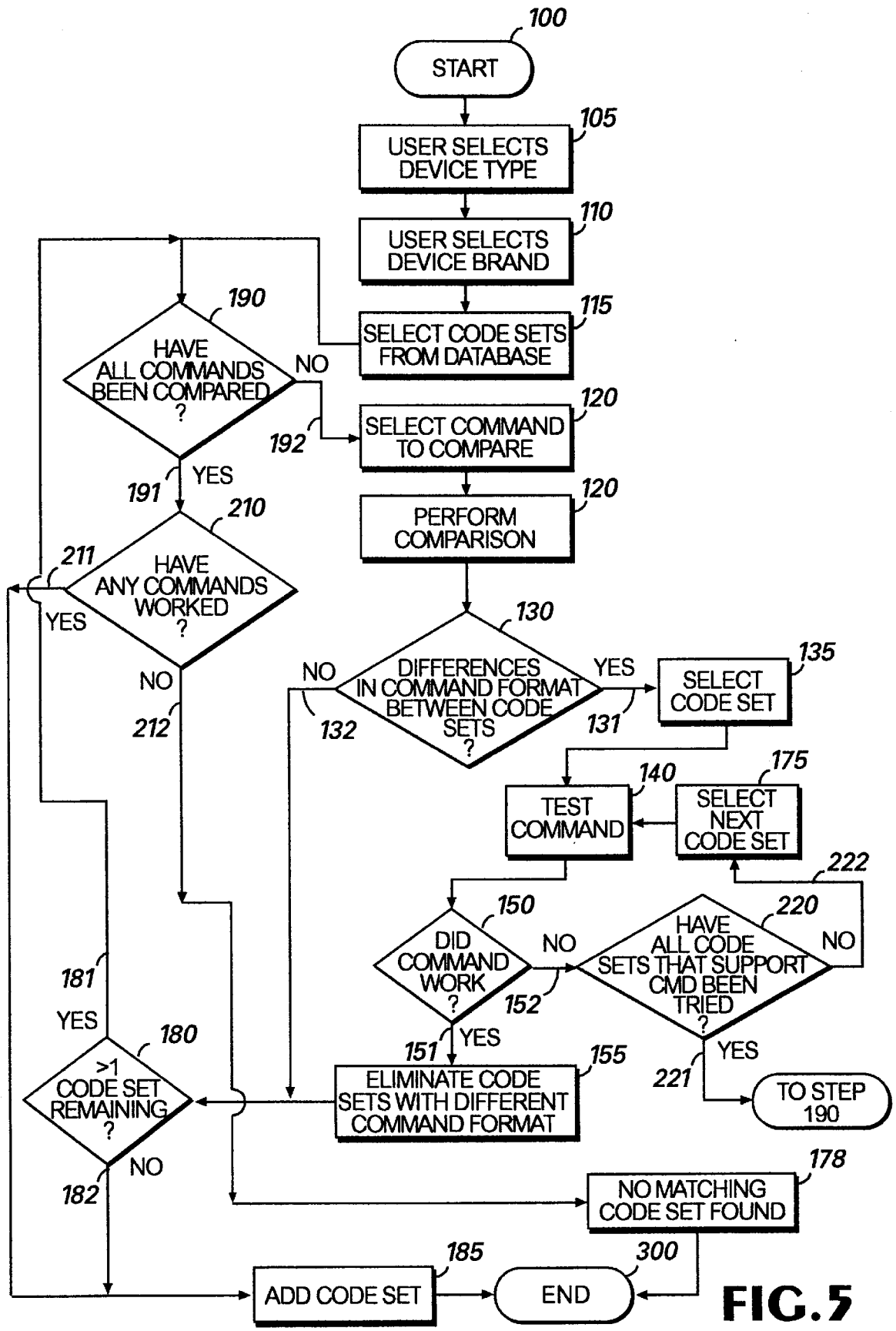
FIG. 5 is a flow chart describing the set-up process in accordance with an embodiment of the present invention.

The method of programming a remote control unit, as described above, is further described with reference to the flow chart of FIG. 5. The method begins at 100. At step 105, the user selects the type of device to be controlled. The remote control unit displays a list of the types of devices the operation of which it can control. At step 110, the user selects the brand of the device to be controlled.

At step 115, the remote control device selects from a database of code sets those code sets corresponding to the type and brand of device selected by the user. At step 190, it is determined whether all commands in the code sets selected at step 115 have been compared. If all commands have been compared, the method follows "yes" branch 191 to step 210. If all commands have not been compared, the method follows "no" branch 192 to step 120.

At step 120, the remote control unit selects a command that will be compared among the code sets selected at step 115. Typically, the first command to be compared is the power command, as the power command is used for most of the devices controlled by the remote control unit.

At step 125, the comparison of the selected command is performed. The remote control unit compares the selected command in each code set selected at step 115 to determine whether command formats in each code set are similar or dissimilar based on whether predetermined command characteristics are within specified tolerances. The remote control unit retains the results of the comparison such that the unit identifies which code sets include similar commands and which code sets include dissimilar commands, if any.

At step 130, the remote control unit determines whether the comparison identified any dissimilarities between the selected command in the selected code sets. If no dissimilarities exist, the method follows "no" branch 132 to step 180. At step 180, it is determined whether more than one code set remains in the group of code sets. If more than one code set remains, the method follows "yes" branch 181 and returns to step 190. If only one code set remains, the method follows "no" branch 182 to step 185. At step 185, the remaining code set is identified as the best code set and is added to the remote control unit. The method then terminates at 300.

If, at step 130, it is determined that dissimilarities exist between the compared commands in the group of selected code sets, the method follows "yes" branch 131 to step 135. It should be understood that if only one code set exists in the database for the device type and brand selected, no dissimilarities between code sets can exist because there is no other code set available for comparison. Nevertheless, if only one code set exists at this point, the method follows "yes" branch 131 to step 135. At step 135, the remote control unit selects a code set from among the smallest group of code sets having similar commands. If, at step 130, it is determined that dissimilarities do not exist between the compared commands in the group of selected code sets, the method follows "no" branch 132 to step 180.

After a code set is selected at step 135, the command from the selected code set is tested at step 140. At step 150, the user provides feedback to the remote control unit regarding whether the tested command worked. If the tested command worked, the method follows "yes" branch 151 to step 155, where the remote control unit eliminates from the group of code sets all code sets that include command formats dissimilar to the format of the tested command. The method then proceeds to step 180.

If the tested command did not work, as determined at step 150, the method follows "no" branch 152 to step 220. At step 220, it is determined whether all the code sets that support the tested command have been selected. If another code set that supports the tested command exists that has not been selected, the method follows "no" branch 222 to step 175. At step 175, another code set is selected and the method returns to step 140. If all the code sets that support the tested command have already been selected, the method follows "yes" branch 221 and the method returns to step 190.

At step 210, it is determined whether any commands that have been tested have worked. If a command has worked, the method follows "yes" branch 211 to step 185. If no command has worked, the method follows "no" branch 212 and the method proceeds to step 178. At step 178, it is determined that no best code set exists for the device selected by the user. The method then terminates at 300.

In summary, the present invention provides a method and system for programming a remote control unit to control the operation of a controllable device. The preferred embodiment of the present invention provides a set-up process for programming a remote control unit by comparing code sets stored in the memory of the remote control unit to identify similarities and dissimilarities between command formats within respective code sets. The preferred embodiment of the present invention utilizes user testing of commands and user feedback regarding the results of such testing to eliminate code sets containing a command format that is dissimilar to the format of the command that was successfully tested. By eliminating code sets from the group of code sets and testing other commands, the remote control unit eventually eliminates all but one code set. The one remaining code set is identified as the best code set and is added to the remote control unit to allow the remote control unit to transmit signals to control operation of the controllable device.

From the foregoing, it will be appreciated that the preferred embodiment of the present invention overcomes the drawbacks of the prior art described hereinabove. From the description of the preferred embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. A method for programming an input device to control operation of one of a predetermined group of controllable devices, comprising the steps of:
   (a) displaying a device selection prompt asking the user to use the input device to transmit a command selecting one of the controllable devices, and receiving a user input command selecting one of the controllable devices;
   (b) selecting a group of code sets that may control the selected controllable device, wherein each code set includes a plurality of commands;
   (c) selecting one of the plurality of commands;
   (d) comparing the selected command in each code set to the respective command in each other code set in the group of code sets to determine which respective commands have dissimilar formats;
   (e) testing the selected command from at least one candidate code set to determine whether the command in the candidate code set operates the controllable device by,
      displaying a first prompt asking the user to use the input device to transmit the selected command for the candidate code set to the selected controllable device,
      displaying a second prompt asking the user to use the input device to reply whether the selected command caused the controllable device to perform a function associated with the selected command, and
      receiving a user input denoting an answer to the second prompt;
   (f) eliminating from consideration within the group of code sets those code sets in which the selected command has a format dissimilar to the format of the selected command in a tested code set that resulted in an affirmative answer to the second prompt;
   (g) selecting another command and returning to step (d) when more than one code set remains in the group of code sets; and
   (h) programming the input device to control operation of the device using the code set when one code set remains in the group of code sets, or when all of the untested commands in the code sets remaining in the group of code sets are similar.

2. The method of claim 1 wherein if no respective commands have dissimilar formats as determined in step (d), then returning to step (c).

3. The method of claim 1 wherein commands are determined to have dissimilar formats when at least one of the command characteristics of each command is not within a predetermined tolerance.

4. The method of claim 3 wherein the command characteristics include the carrier frequency of the signal used to transmit the command from the input device to the controllable device.

5. The method of claim 3 wherein the command characteristics include the number of bits comprising the signal used to transmit the command from the input device to the controllable device.

6. The method of claim 3 wherein the command characteristics include the pulse width of each bit comprising the signal used to transmit the command from the input device to the controllable device.

7. The method of claim 1 wherein the code sets are stored in the input device.

8. The method of claim 1 wherein the controllable device is selected from the group consisting of a television, video cassette recorder, cable box, compact disk player, tuner, cassette player, satellite receiver, laser disk player, and an appliance.

9. The method of claim 1 wherein the commands are determined to have dissimilar formats when a command exists in at least one code set but no corresponding command exists in another code set.

10. An input device operative to control operation of one of a predetermined group of controllable devices, comprising:
   a processing device;
   a memory, coupled to the processing device, storing a program module and a database including a plurality of code sets associated with a plurality of controllable devices; and
   the processing device, responsive to instructions from the program module, operative for:
   (a) displaying a device selection prompt asking the user to use the input device to transmit a command selecting one of the controllable devices, and receiving a user input command selecting one of the controlable devices;
   (b) selecting a group of code sets that may control the selected controllable device, wherein each code set includes a plurality of commands;
   (c) selecting one of the plurality of commands;
   (d) comparing the selected command in each code set to the respective command in each other code set in the group of code sets to determine which respective commands have dissimilar formats;
   (e) testing the selected command from at least one candidate code set to determine whether the command in the candidate code set operates the controllable device by,
      displaying a first prompt asking the user to use the input device to transmit the selected command for the candidate code set to the selected controllable device,
      displaying a second prompt asking the user to use the input device to reply whether the selected command caused the controllable device to perform a function associated with the selected command, and
      receiving a user input denoting an answer to the second prompt;
   (f) eliminating from consideration within the group of code sets those code sets in which the selected command has a format dissimilar to the format of the selected command in a tested code set that resulted in an affirmative answer to the second prompt;
   (g) selecting another command and return to step (d) when more than one code set remains in the group of code sets; and
   (h) programming the input device to control operation of the controllable device using the code set if one code remains in the group of code sets.

11. The input device of claim 10 wherein if no respective commands have dissimilar formats as determined in (d), then returning to (c).

12. The input device of claim 10 wherein the selected command is determined to have dissimilar formats within the group of code sets that may control the selected controllable device when at least one of the command characteristics of the selected command in one of the code sets is not within a predetermined tolerance defined with respect to the command characteristic for the respective command in the other code sets in the group of code sets that may control the selected controllable device.

13. The input device of claim 12 wherein the command characteristics include the carrier frequency of the signal used to transmit the command from the input device to the controllable device.

14. The input device of claim 12 wherein the command characteristics include the number of bits and the pulse width of each bit comprising the signal used to transmit the command from the input device to the controllable device.

15. The input device of claim 10 wherein the controllable device is selected from the group consisting of a television, video cassette recorder, cable box, compact disk player, tuner, cassette player, satellite receiver, laser disk player, and an appliance.

16. The input device of claim 10 wherein commands are determined to have dissimilar formats when a command exists in at least one code set but no corresponding command exists in another code set.

17. A computer-readable medium on which is stored a program module for programming a computing device to control operation of one of a predetermined group of controllable devices, the program module comprising instructions which, when executed by the computing device, perform the steps of:
   (a) displaying a device selection prompt asking the user to use the input device to transmit a command selecting one of the controllable devices, and receiving a user input command selecting one of the controllable devices;
   (b) selecting a group of code sets that may control the selected controllable device, wherein each code set includes a plurality of commands;
   (c) selecting one of the plurality of commands;
   (d) comparing the selected command in each code set to the respective command in each other code set in the group of code sets to determine which respective commands have dissimilar formats;
   (e) testing the selected command from at least one candidate code set to determine whether the command in the candidate code set operates the controllable device by,
      displaying a first prompt asking the user to use the input device to transmit the selected command for the candidate code set to the selected controllable device,
      displaying a second prompt asking the user to use the input device to reply whether the selected command caused the controllable device to perform a function associated with the selected command, and
      receiving a user input denoting an answer to the second prompt;
   (f) eliminating from consideration within the group of code sets those code sets in which the selected command has a format dissimilar to the format of the selected command in a tested code set that resulted in an affirmative answer to the second prompt;
   (g) selecting another command and return to step (d) when more than one code set remains in the group of code sets; and
   (h) programming the input device to control operation of the controllable device using the code set if one code remains in the group of code sets.

18. The medium of claim 17 wherein if no respective commands have dissimilar formats as determined in step (d), then returning to step (c).

19. The medium of claim 17 wherein commands are determined to have dissimilar formats when at least one of the command characteristics of each command is not within a predetermined tolerance.

20. The medium of claim 19 wherein the command characteristics include the carrier frequency of the signal used to transmit the command from the input device to the device.

21. The medium of claim 19 wherein the command characteristics include the number of bits and the pulse width of each bit comprising the signal used to transmit the command from the input device to the controllable device.

22. The medium of claim 17 wherein the code sets are stored in a database in the memory of the input device.

23. The medium of claim 17 wherein commands are determined to have dissimilar formats when a command exists in at least one code set but no corresponding command exists in another code set.

24. A method for programming an input device to control operation of a controllable device, comprising the steps of:

displaying a device selection prompt asking the user to use the input device to transmit a command selecting one of the controllable devices;

receiving a user input command selecting one of the controllable devices;

selecting a candidate code set from a group of code sets that may control the selected controllable device;

testing the candidate code set to determine whether it operates the controllable device by, displaying a first prompt asking the user to use the input device to transmit a selected command from the candidate code set to the controllable device, displaying a second prompt asking the user to use the input device to reply whether the selected command caused the controllable device to perform a function associated with the selected command, and receiving a user input denoting an answer to the second prompt;

if the answer to the second prompt is affirmative, programming the input device with the candidate code set; and if the answer to the second prompt is negative, eliminating the candidate from the group of code sets and testing another candidate code set in the group of code sets that may control the selected controllable device.

25. A computer storage medium storing computer-readable instructions for performing the method of claim 24.

26. An input device configured to perform the method of claim 24.

* * * * *